United States Patent

[11] 3,578,269

[72] Inventors Kenneth C. Kramer
 Thousand Oaks;
 Richard L. Davis, Pacific Palisades; Otto H. Boe, Saugus, Calif.
[21] Appl. No. 839,766
[22] Filed June 11, 1969
[45] Patented May 11, 1971
[73] Assignee Lear Siegler, Inc.
 Santa Monica, Calif.
 Continuation-in-part of application Ser. No. 631,972, Apr. 17, 1967, now abandoned.

[54] AUTOMATIC FLARE AND ALTITUDE HOLD SYSTEM
 27 Claims, 3 Drawing Figs.
[52] U.S. Cl. .................................................... 244/77
[51] Int. Cl. ..................................................... B64c 13/18
[50] Field of Search ........................................... 244/77 (A); 343/108, 108 (M); 318/(20.209) (Unofficial breakdown of 489)

[56] References Cited
UNITED STATES PATENTS

| | | | |
|---|---|---|---|
| 2,830,291 | 4/1958 | Hecht et al. ................ | 244/77 |
| 2,841,345 | 7/1958 | Halpert et al. ............... | 244/77 |
| 3,447,765 | 6/1969 | Doniger et al. .............. | 244/77 |

Primary Examiner—Milton Buchler
Assistant Examiner—James E. Pittenger
Attorney—Christie, Parker and Hale ABSTRACT: The invention disclosed by one representative embodiment herein includes an automatic pitch control system for an aircraft wherein a manual setting at any selected altitude produces a signal which is nulled out by a radar altimeter signal so as to automatically engage a pitch control flare circuit. Altitude error and altitude rate input signals are summed for control of the pitch axis of the aircraft so that after flare is completed, an altitude over varying terrain is held. Steep bank angles at the altitude are possible without the aircraft leaving the altitude in that a roll attitude signal is employed to oppose normal acceleration errors introduced by banking during coordinated turns. In addition, variable flare exponentials are described through the use of an altitude modification circuit.

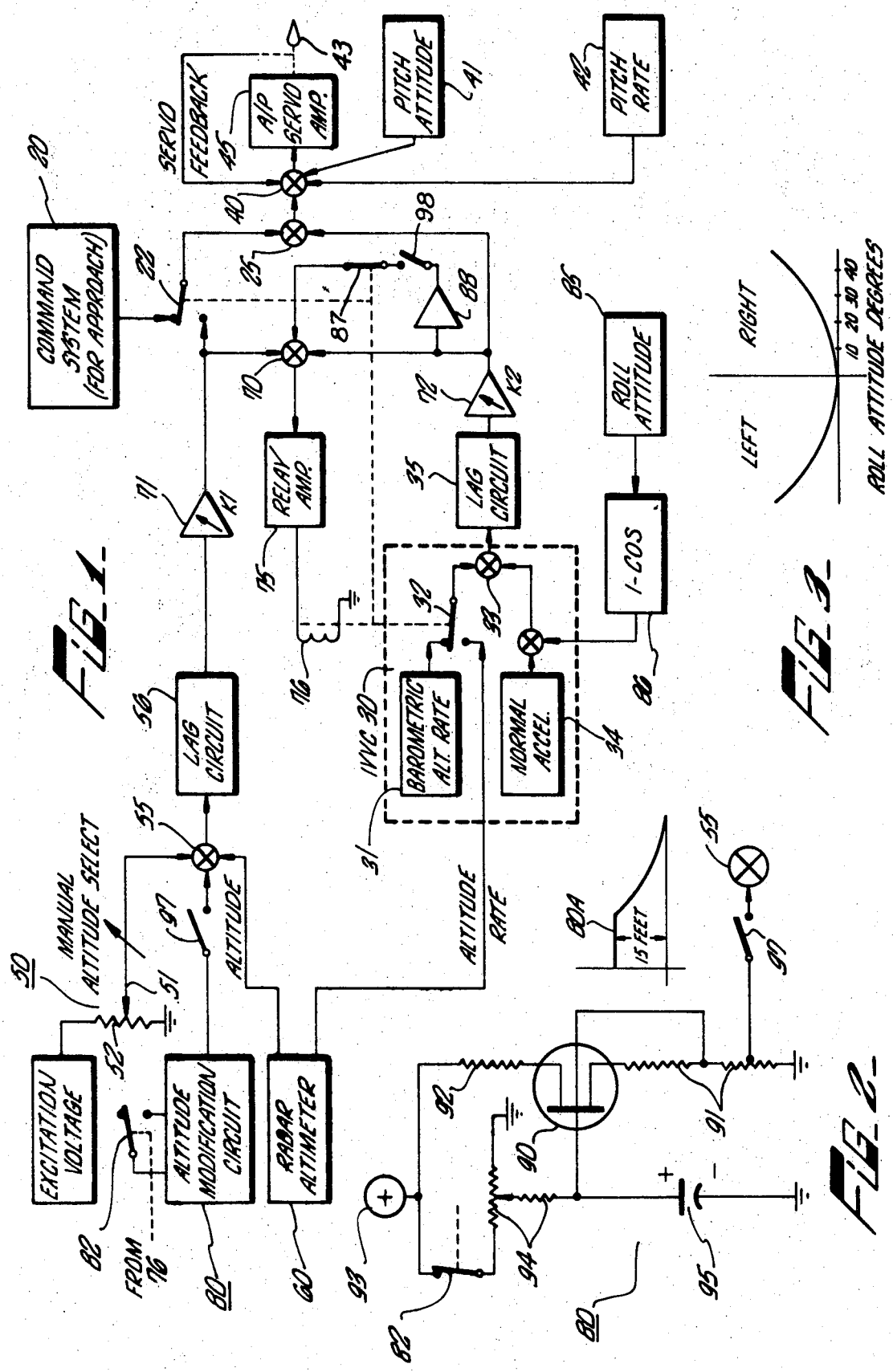

AUTOMATIC FLARE AND ALTITUDE HOLD SYSTEM

CROSS-REFERENCES TO RELATED APPLICATIONS

This is a continuation-in-part of a copending application, Ser. No. 631,972, filed on Apr. 17, 1967, now abandoned.

BACKGROUND OF THE INVENTION

1. Field of the Invention

The field of this invention includes automatic control systems for airborne vehicles and in one illustrative embodiment, the field of this invention is directed to an automatic flare system for an aircraft, which flare terminates in an absolute altitude that is held over rolling terrain. This absolute altitude hold is valuable for terrain avoidance, terrain surveillance and cargo and missile ejection. Inasmuch as the predetermined absolute altitude capabilities of this invention includes land as the selected altitude, the field of this invention extends to landing systems for aircraft.

2. Description of the Prior Art

Automatic landing systems which include flare computers are, of course, well known. The prior art systems flare to touchdown only and do not include or encompass any provision for flaring to an absolute altitude which absolute altitude is automatically held by the aircraft. The prior art automatic flare computer circuits generally are restricted in their operation to a landing strip which is provided with a radar beam for guidance. This invention, although encompassing the use of a radar beam such as an ILS signal, is not necessarily limited thereto and, in fact, the automatic flare capability and absolute altitude hold capability of this invention may be readily accomplished without any ILS signal.

There are known prior art techniques for holding an altitude once achieved. However, such techniques do not include automatic flare capability to the absolute altitude to be held. In such prior art, the pilot manually flares the aircraft and manually seeks out the altitude which he desires to maintain. This technique thus occupies the pilot's attention during critical times, especially if the absolute altitude desired to be maintained is in the area within 5 feet above the surface. Furthermore, such low altitudes are difficult to achieve without the automatic flare capability as disclosed and claimed in this invention.

SUMMARY OF THE INVENTION

The foregoing disadvantages of the prior art are avoided in accordance with the principles of this invention wherein an automatic system for providing control of an aircraft about its pitch axis includes an elevator control means which responds to a command signal, or to a pilot initiated command for assuming a commanded rate of descent. Means are provided for continually monitoring the aircraft's vertical velocity so as to hold the aircraft on the commanded rate of descent. A manually operative altitude select circuit emits an output signal proportional to an altitude which is selected for the aircraft to assume and hold. This altitude select signal is summed with a signal proportional to the absolute altitude of the aircraft, and the summed signal is modified by a signal representative of the instantaneous vertical velocity of the aircraft so as to engage an automatic flare system at an appropriate altitude away from the selected altitude based upon the rate of descent, or ascent, of the aircraft, as it approaches the selected altitude. Once the flare to the selected altitude is achieved in accordance with the principles of this invention, the altitude rate signal of the aircraft is obtained by a radar altimeter rather than a barometric altimeter so as to assure an absolute altitude hold.

An altitude modification circuit, in accordance with this invention, may be employed by the pilot wherein a bias value is superimposed on the output signal established at the radar altimeter so as to add the true altitude detected by the radar altimeter. This bias signal is held at a constant value until flare initiation. After flare initiation, it decays to zero, and the flare terminates in accordance with the true altimeter reading.

Requirements present themselves in absolute altitude hold situations, wherein the pilot may be required to bank the aircraft in a succession of significantly steep bank angles so as, for example, continually to retrace a particular area. These situations include terrain surveillance and cargo pickup and ejection. In executing coordinated turns at significantly steep bank angles, we have discovered that the increased gravitational, or G, forces introduce a normal acceleration error which is interpreted by the system as an increase in the aircraft's altitude. Therefore, the control system tends to bring the altitude of the aircraft to a lower value to compensate for the normal acceleration output signal. Thus, a series of turns tends to force the aircraft to depart from its absolute altitude, and also introduces significant and unwarranted control activity within the aircraft as the steep bank angles are executed. A roll attitude monitoring circuit emits an output signal which is proportional to the roll attitude during a turn. This roll attitude output signal is modified, and the modified signal opposes the normal acceleration signal emitted during a coordinated turn. Accordingly, absolute altitude is held on flight paths other than those having a constant heading.

BRIEF DESCRIPTION OF THE DRAWINGS

FIG. 1 depicts in block diagram and circuit schematic form an automatic flare and altitude hold system in accordance with the principles of this invention;

FIG. 2 depicts a circuit schematic for the altitude modification circuit of FIG. 1; and FIG. 3 is a wave form useful in promoting a clear understanding of a circuit component of FIG. 1.

DESCRIPTION OF THE PREFERRED EMBODIMENT

Turning now to FIG. 1, an automatic flare and altitude hold system in accordance with this invention is depicted in block form. A command output from circuit 20 is applied as one term to a summing junction 25 through a relay contact, or other switch means, 22. Another term applied to junction 25 is an output signal from an instantaneous vertical circuit (hereinafter referred to as IVVC 30). Commanded circuit 20 and IVVC 30 are described in considerable detail in a Patent application having Ser. No. 463,811 assigned to the same assignee as the present application. Reference may be made to that patent application if a detailed description of such components is desired.

Briefly, however, IVVC 30 includes a barometric altitude rate circuit 31 which emits an output signal proportional to the rate of change of altitude as referenced to barometric pressure, i.e., referenced to sea level. This barometric altitude rate signal is applied to a summing junction 33 through a relay contact, or other switch means, 32. Also supplied to summing junction 33 is an output signal from a normal accelerometer circuit 34. A normal accelerometer, as is well known, emits an output signal proportional to the acceleration of the aircraft about an axis which is perpendicular to the plane defined by the longitudinal and lateral axis of the aircraft. This reference axis for the normal accelerometer 34 is normally referred to as a vertical axis. The output from normal accelerometer 34 is positive or negative in polarity and/or phase (depending on whether a DC or AC system is being employed) for either a rise or a drop in altitude acceleration. A lag circuit 35 is connected to the output of the summing junction 33. This lag circuit 35 serves to combine the long term response from the rate circuit 31 and the fast term response of the normal acceleration circuit 34 into a more effective command signal in a manner which is well known in the art.

The lagged output from the lag circuit 35 is applied to summing junction 25 and tends to correct for and smooth out any departure of the aircraft from the commanded rate of descent as directed by the output signal from circuit 20. Command circuit 20 may be an approach system utilizing a glide slope beam error as a reference or it may be any previously computed value. In either event, if the aircraft tends to deviate from the commanded rate of descent, the output of the IVVC 30 tends to bring the aircraft back to its commanded rate of descent through an error signal applied to an additional summing junction 40. Summing junction 40 receives as its input terms, signals from a pitch attitude circuit 41, a pitch rate circuit 42, and a feedback signal from the output of a servoamplifier and actuator circuit 45. The operation of the pitch attitude, pitch rate and servo feedback terms for junction 40 are described in conjunction with the foregoing patent application and need not be repeated in detail herein. Basically, these circuits cooperate, in accordance with the input signal at summing junction 40, to move a rudder surface 41, or any control steering surface, an amount sufficient to keep the aircraft stabilized on its commanded rate of descent.

In the foregoing description, it was assumed that the aircraft was descending, or ascending, at some constant rate toward an altitude which is any given altitude a pilot selects as his "hold" altitude. The altitude select is accomplished by a manual setting on a circuit such as the altitude select circuit 50. This altitude select circuit 50 emits an output signal having a polarity and/or phase that is proportional to an equal corresponding amount for the selected altitude, as is expected from radar altimeter circuit 60. As is well known, radar altimeter circuit 60 emits an output signal proportional to the altitude of the aircraft referenced to ground, rather than to sea level as is the case of the barometric altimeter 31.

To choose a nonlimiting example for purposes of discussion, assume that the pilot has chosen 20 feet as his "hold" altitude. A manual setting of 20 feet at the altitude circuit 50 involves moving a slider arm 51 along a potentiometer 52 so as to vary the amount of excitation voltage which is applied to summing junction 55. Radar altimeter 60 will emit an output signal at 20 feet which exactly nulls out the excitation voltage applied to summing junction 55 by the altitude select circuit 50. A second lag circuit 56 which may be any suitable filter circuit for providing signal shaping and smoothing is connected between the output of the summing junction 55 and an additional summing junction 70, so as to supply the altitude select error from summing junction 55 to summing junction 70.

A relay amplifier 75 is connected to summing junction 70. Relay amplifier 75 is any known amplifier which responds to a nulled condition at its input by energizing the relay coil 76. Relay coil 76 controls switches 22, 32, 82 and 87. Switches 82, 87 and their associated circuitry will be described in detail hereinafter, following a continuation of the description of the automatic flare and altitude hold operation of this invention.

Relay amplifier 75 responds to a null or zero algebraic summation from summing junction 70 so as to move switches 22 and 32 to the lower contacts thus removing the command circuit 20 and the barometric rate circuit 31 from the pitch control system. Output signals from amplifiers 71 and 72 serve as the input terms for summing junction 25. The gains of amplifiers 71 and 72 are adjustable and are adjusted to fixed amounts in accordance with the flare exponential that is desired.

The ratio of the outputs K1 and K2, as shown by the gain arrows for amplifiers 71 and 72, controls the exponential flare path. Thus, if the rate of K1 and K2 is a large term, then flare of the aircraft is initiated sooner and a slower flare is obtained. On the other hand, if the ratio of K1 and K2 is small, then flare is initiated somewhat later; however, faster flare is obtained. Thus, the ratio of K1 and K2 is adjusted at a fixed amount selected for a desired flare exponential.

Relay amplifier 75, in the foregoing description, responded to a null condition in altitude error from summing junction 55. This situation ignored the output term to summing junction 70 from the IVVC 30 for purposes of description clarity. In actual operation, of course, the aircraft will be climbing or descending toward the selected altitude with a substantial rate of descent which may be as much as several feet per second. In accordance with the principles of this invention, the rate of descent from a barometric altimeter 31 is applied to summing junction 70 so as to oppose the output from summing junction 55. The purpose of the rate of descent signal opposing the altitude error signal from summing junction 55 is to compensate for widely divergent angles of attack toward the select altitude. Thus, if the aircraft is on a flight path which will interest the selected altitude at a steep angle, i.e., a high rate of descent, then the relay amplifier 75 must respond by initiating the automatic flare maneuver sooner than for a lesser angle of attack. This divergency in angle of attack is accomplished by opposing and finally nulling out the altitude error signal from junction 55 in accordance with the actual rate of descent as measured by IVVC 30.

To return to our assumed example, if the selected altitude is 20 feet, the output signal present on slider arm 51 may be in the order of one volt and the altitude output of radar altimeter 60 would, in a likewise manner, by 1 volt at an actual altitude of 20 feet. For altitudes above 20 feet, radar altimeter 60 emits output signals say, in excess of 1 volt; 1½ volts at 70 feet of actual altitude as an example. Assuming that the aircraft, at an altitude of 70 feet, is approaching the selected altitude with a vertical rate of descent of approximately 10 feet per second, it is then necessary that the circuit take this rate of descent into consideration in order to automatically flare the aircraft into the "hold" altitude of 20 feet. If it is assumed that the output from IVVC 30 is one-half volt for a 10 foot per second descent, then null at summing junction 70 is obtained at an altitude of 70 feet. Relay amplifier 75 is thus energized at 70 feet, and coil 76 closes switches 22 and 32.

In a similar manner of the rate of descent is less, then the IVVC 30 output is less and the aircraft's flare is not initiated until an altitude somewhere between 20 feet and 70 feet is reached. Any and all angles of attack are thus compensated for by the novel flare initiation techniques of this invention.

After flare has been initiated and accomplished in accordance with the foregoing description, the aircraft will be in level flight substantially at the selected altitude. Any deviation from that altitude is corrected for by the altitude error signal from summing junction 55 and by the altitude rate signal from radar altimeter 60 as applied to summing junction 25 by IVVC 30. It is essential that the radar altimeter be substituted for the barometric altimeter by closure of relay contact 32 so as to maintain the aircraft at an absolute altitude above the terrain. This, of course, is impossible with a barometric altimeter such as 31. Utilization of the radar altimeter 60 allows the aircraft to maintain an absolute altitude over rolling terrain without any pilot effort to compensate for hills and valleys as such compensation is achieved automatically in the manner hereinafter described.

When relay contacts 22 and 32 are closed to the lower terminals, the aircraft is held on the selected altitude by the altitude select signal being considered as the primary reference signal, and the altitude rate output from IVVC 30 being considered as a damping term which tends to hold the aircraft on the referenced altitude. Thus, should the aircraft tend to deviate from the selected altitude the rate of change in altitude by the aircraft will be sensed by the radar altimeter 60 and an immediate short term correction signal is applied to summing junction 25 so as to bring the aircraft back to the "hold" altitude.

It is desirable, once the absolute altitude has been achieved, to allow banking of the aircraft so as to follow any predetermined path without introducing any change in the altitude. Thus, if a human or autopilot system initiates a series of steep coordinated turns, the aircraft must maintain its absolute altitude. From the foregoing description, however, it is apparent that summing junction 33 receives in addition to the altitude rate term, an output from the normal accelerator 34. We have discovered that in a sharp turn, for example, a 20° to 45°, turn to pick a nonlimiting example, there are increased gravitational forces present in the aircraft. These so-called G forces are interpreted by the normal accelerometer 34 as an acceleration in the upward vertical direction when, in fact, no such movement has occurred. The output from the normal accelerometer 34 would thus be of the polarity and/or phase so as to drop the aircraft's altitude. The radar altimeter 69 would, of course, detect the difference, i.e., a drop in altitude below the altitude hold level, and it would tend to correct for the unwarranted drop. Reliance on such a long term correction, however, is detrimental at low altitudes and introduce considerable instability in the altitude hold circuit. Accordingly, in accordance with the principles of this invention, means are included in the aircraft in the form of a roll attitude circuit 85 for emitting an output signal which is proportional to the angular movement of the lateral axis about the longitudinal axis as referenced to a level flight condition. This output from the roll attitude circuit 85 is applied to a function generator 86 which responds to the input signal by emitting an output signal corresponding to one minus the cosine of the input signal. One minus the cosine function generators are known to the prior art and need not be described in detail. FIG. 3 is a wave form depicting the signal output for such a function generator plotted as a function of roll attitude in degrees. As noted from FIG. 3 one minus the cosine of the input signal gives a positive signal on both sides of a zero reference for the roll attitude. Thus, if a coordinated turn, either to the right or to the left occurs, the normal accelerometer 34 interprets this turn as a rise in the altitude of the aircraft and the one minus cosine signal is selected so as to null out the output from the normal accelerometer 34. This technique, of course, allows the normal accelerometer 34 to continue to be operational to vertical movements during level flight. However, any unwarranted outputs resulting from coordinated turns are cancelled out by the roll attitude and the one minus cosine function generator combination of circuits 85 and 86.

As mentioned hereinbefore, the gains of K1 and K2 are preset values for a given rate of descent. In some instances, this rate of descent at its preset value, may not suit the mission requirements. For example, the given rate of descent for an automatic flare at an altitude hold of 5 feet above the landing surface may be such that the pilot and passengers become alarmed in that the flare maneuvers do not start soon enough. In order to adjust the initiation of the flare, it would require a readjustment of the K1 and K2 gain values. Such circuit parameters are fairly crucial and are not readily adjustable during flight. Therefore, in accordance with the principles of this invention, such parameters remain at their preselected value and instead an altitude modification circuit 80 (FIG. 1) is employed.

This altitude modification circuit 80 is repeated in detail in FIG. 2. Basically, the altitude modification circuit 80 superimposes a signal having the same polarity and/or phase as the output signal from radar altimeter 60. Furthermore, the output of the altitude modification circuit 80 is of a value which decays to zero itself so that the true altitude hold will, in fact, be an absolute altitude as determined by the radar altimeter.

Reference to details of FIG. 2 depicts a field effect transistor 90 having an output resistor 91 connected between an output terminal and ground. The input terminal for the transistor 90 includes a resistor 92 which is connected to a source of potential 93. Potential source 93 is also connected through a normally closed relay contact 82 which is controlled by the flare initiate relay 76, to a potential divider 94. Potential source 93 charges a capacitor 95 through the closed relay contact 82 and the potential divider 94. An output switch 97 is normally open and may be closed manually so as to apply the altitude modification signal to the summing junction 25.

With relay contacts 82 in their normally closed position, an output level of waveform 80A is continually applied to summing junction 25. This output signal 80A is initially indicative of an altitude reading from radar altimeter 60. As shown in the output waveform 80A, such an output may initially represent 15 feet, which output is superimposed with the output from radar altimeter 60. Thus, at summing junction 55, an input signal proportional to an altitude 15 feet higher than the actual altitude reading is present. Accordingly, flare will be initiated in the manner described hereinbefore, but such initiation occurs at an altitude 15 feet higher than is the case when the output 80A from circuit 80 is absent.

Upon flare initiation relay coil 76 opens the normally closed contact 82. Capacitor 95 is no longer provided with a holding voltage from source 93, and accordingly it discharges to ground through the potential divider 94. The output waveform 80A for the modification circuit 80, follows the discharge of capacitor 95 which is an exponential decay to zero. At zero, the field effect transistor 90 turns off, and thereafter the radar altimeter circuit 60 alone provides the altitude reference which, of course, is the true absolute altitude now that the bias signal from modification circuit 80 has decayed to zero. In accordance with the foregoing description, the modification circuit has thus caused flare initiation to occur without a transient at a higher altitude and has controlled the aircraft during the flare into the hold altitude in such a manner that it enters the altitude hold level with very little overshoot. The decay characteristics for output waveform 80A of modification circuit 80, of course, may be varied at will through choice of capacitor and resistor values.

In certain mission requirements, it may be desirable to delay the point of flare initiation to some point other than that normally expected by the settings of K1 and K2; and, once the flare is initiated, thereafter abruptly seek the altitude hold level at the standard K1 and K2 ratio. This alternative mode of operation is provided by manually closing switch 87 so as to apply a portion of the output from IVVC 30 to the summing junction 70 in opposition to itself. The portion which is tapped off by amplifier 88 is, of course, inverted and thus opposes the output from IVVC 30. This technique thus assures that null at junction 70 is referenced at a lower point than is the case when switch 87 is in its normally open position. Once null is achieved at this lower flare initiation point, however, relay coil 76 opens switch 87. Thereafter summing junction 25 receives an unmodified K1 and K2 ratio in the form of a larger error signal and flare to the selected altitude occurs more rapidly than in the operation described earlier.

In the description of this invention it was noted that either a human or an autopilot approach is within the principles of this invention. Similarly, the selected altitude to be held may be a landing surface without departing from the scope of this invention.

The subject invention has been described with reference to certain preferred embodiments; it will be understood by those skilled in the art to which this invention pertains that the scope and spirit of the appended claims should not necessarily be limited to the embodiments described. For example, the invention also contemplates a flare into level flight at an actual altitude, i.e., an altitude sensed by a barometric altimeter, and contemplates the initiation of flare at the point of time when the rat of change of altitude and the actual altitude error, i.e., a deviation from a selected hold altitude sensed by a barometric altimeter, assume a predetermined relationship.

We claim:

1. A system for automatically flaring an aircraft into an altitude to be held comprising:
   means for sensing the rate of change of altitude of said aircraft as it approaches the altitude to be held;
   means in said aircraft energizable upon command for controlling a flare path for said aircraft, said flare path varying in a fixed ratio as a function of altitude error relative to the altitude to be held and the altitude rate changes of said aircraft; and
   command means responsive to said sensing means upon the occurrence of a predetermined relationship between said rate of change of altitude and said altitude error for energizing said flare path controlling means at an altitude that permits said aircraft to flare into substantially level flight at the altitude to be held.

2. A system in accordance with claim 1, and further comprising:
   means sensing altitude deviations of said aircraft from the altitude to be held; and
   means responsive to said altitude deviation sensing means for returning said aircraft to the altitude to be held after the aircraft has been flared.

3. A system in accordance with claim 1, wherein said means for sensing the rate of change of altitude of said aircraft as it approaches the altitude to be held comprises:
a barometric altimeter for emitting a barometric altitude rate signal;
a normal acceleration circuit for emitting a vertical acceleration signal; and
a summation junction for combining said altitude rate and vertical acceleration signals.

4. A system in accordance with claim 1, wherein said command means for energizing said flare path controlling means comprises:
a null signal responsive switching control circuit;
first means connecting said rate sensing means to said switching control circuit as one input signal;
means for emitting an altitude error signal proportional to the difference between the instantaneous altitude of said aircraft and the altitude to be held; and
second means connecting said altitude error signal emitting means to said switching control circuit as another input signal thereto.

5. A system in accordance with claim 4, wherein said altitude error signal emitting means comprises:
means selectively settable for emitting a signal indicative of a desired absolute altitude to be held;
means for emitting a signal indicative of the instantaneous absolute altitude of said aircraft; and
means combining said desired absolute altitude signal and said instantaneous absolute altitude signal to derive a difference signal as said altitude error signal.

6. A system in accordance with claim 5, wherein said selectively settable means comprises a manually adjustable signal generator having selective outputs for selected absolute altitudes.

7. A system in accordance with claim 4, wherein said null signal responsive switching control circuit comprises an amplifier which responds to a null input condition to control switching contact means.

8. A system in accordance with claim 7, and further comprising:
means for receiving a signal to control movement of said aircraft about its pitch axis; and
first contact means controlled by said amplifier for applying said altitude error signal to said signal receiving means after said command means is energized.

9. A system in accordance with claim 8, in which:
said means for sensing the rate of change of altitude of said aircraft as it approaches the altitude to be held comprises a barometric altimeter for emitting a barometric altitude rate signal, a normal acceleration circuit for emitting a vertical acceleration signal, and a summation junction for combining said altitude rate and vertical acceleration signals;
a radar altimeter circuit is provided for emitting an absolute altitude rate signal; and
second contact means controlled by said amplifier are provided for disconnecting said barometric altimeter from said summation junction and connecting said radar altimeter thereto.

10. A system in accordance with claim 9, further comprising means connecting said summation junction to said signal receiving means.

11. A system in accordance with claim 10, wherein said connecting means comprises a second signal summation junction for summing said altitude error signal and said absolute altitude rate signal.

12. A system in accordance with claim 11, with signal responsive means connected to said signal receiving means for controlling movements of said aircraft about its pitch axis, said signal responsive means comprising:
an elevator actuator control servo; and
signal applying means connected between said second summation junction and said elevator actuator control servo.

13. A system in accordance with claim 1, wherein:

said actual rate sensing means comprises an altimeter, means for deriving the rate of the altimeter output, a normal acceleration circuit which emits an erroneous vertical acceleration signal indicative of an upward movement of the aircraft during roll attitude movements of said aircraft about its rolls axis which fail to include any vertical movement, and means for combining the acceleration signal with the rate signal, means are provided responsive to roll attitude movements for cancelling said erroneous vertical acceleration signal.

14. A system in accordance with claim 13, in which said erroneous signal cancelling means comprises:
means responsive to roll attitude movements for emitting an output signal proportional thereto;
means for modifying said output signal to oppose the vertical acceleration signal emitted for any given roll attitude; and
a signal summation junction for algebraically summing said erroneous vertical acceleration signal and said modified output signal.

15. A system in accordance with claim 14, in which the means for modifying said output signal comprises a function generator that produces a signal with a value one minus the cosine of the signal applied thereto.

16. A system in accordance with claim 1, further comprising means selectively operative for altering the altitude at which the flare path controlling means is energized by said command means without varying said fixed ratio of said flare path.

17. A system in accordance with claim 16, in which said altitude altering means comprises:
means for emitting a signal proportional to the altitude of the aircraft; and
a signal generator for superimposing upon said altitude signal a bias level which as the effect of temporarily altering the altitude represented by said altitude signal.

18. A system in accordance with claim 17, in which said signal generator emits a bias signal having a predetermined level which decays to zero.

19. A system in accordance with claim 17, in which said signal generator emits a signal which begins to decay responsive to said command means when said command means energizes said flare path controlling means.

20. A system for flaring an aircraft into level flight at a predetermined altitude comprising:
means for generating a first signal representative of the altitude error of the aircraft relative to the predetermined altitude;
means for sensing the rate of change of altitude of the aircraft, the sensing means generating a second signal representative of the rate of change of altitude of the aircraft;
means responsive to the generating and sensing means for comparing the first and second signals;
means responsive to the comparing means upon the establishment of a particular relationship between the first and second signals for producing a third signal representing a desired flare path; and
a utilization device responsive to the third signal after the establishment of the particular relationship between the first and second signals.

21. The system of claim 20, in which the first signal generating means comprises a radar altimeter, a bias source representative of the predetermined altitude, and means for differentially combining the outputs of the radar altimeter and the bias source.

22. The system of claim 20, in which the means for producing a third signal is coupled to the utilization device by a switch that is closed responsive to the comparating means.

23. A system for automatically flaring an aircraft into level flight at a predetermined altitude comprising:
means for generating a first signal representing the altitude error of the aircraft relative to the predetermined altitude;
means for generating a second signal representing the absolute rate of change of altitude of the aircraft;

means for combining the first and second signals to produce a flare path command signal that is the difference between the first and second signals;

a pitch controller for varying the pitch of the aircraft responsive to a command signal; and means upon the attainment of an altitude error that permits the aircraft to flare into a substantially level position at the predetermined altitude for coupling the third signal to the pitch controller as the command signal to initiate the flare maneuver.

24. The system of claim 23, in which the second signal generating means comprises a radar altimeter and means for deriving the rate of the radar altimeter output.

25. The system of claim 24, in which the first signal generating means comprises a bias source representing a preselected altitude and means for differentially combining the outputs of the bias source and the radar altimeter 26. An automatic flare and altitude hold circuit for an aircraft comprising:

means selectively settable for emitting an output signal proportional to a selected altitude to be held by said aircraft;

means for sensing the altitude of said aircraft and emitting an altitude error signal proportional to the altitude difference between the sensed and selected altitudes;

means for sensing the instantaneous vertical velocity of the aircraft and emitting an output signal proportional thereto;

a summing junction for comparing said instantaneous vertical velocity signal and said altitude error signal and emitting a flare initiate command signal when both signals assume a predetermined relationship;

signal responsive means for controlling movements of the aircraft about its pitch axis;

means for emitting a signal proportional to a preselected flare exponential for said aircraft; and switching means selectively responsive to said flare initiate command signal for connecting said flare exponential signal emitting means to said pitch axis control means.

27. The circuit of claim 26, in which the means for sensing altitude is a radar altimeter.